(12) United States Patent
Schwartz et al.

(10) Patent No.: US 11,334,657 B2
(45) Date of Patent: May 17, 2022

(54) METHOD AND SYSTEM FOR AUTHENTICATING USERS

(71) Applicants: Assaf Schwartz, Natanya (IL); Eliran Fadlon, Hatzor Haglilit (IL)

(72) Inventors: Assaf Schwartz, Natanya (IL); Eliran Fadlon, Hatzor Haglilit (IL)

(*) Notice: Subject to any disclaimer, the term of this patent is extended or adjusted under 35 U.S.C. 154(b) by 635 days.

(21) Appl. No.: 16/106,046

(22) Filed: Aug. 21, 2018

(65) Prior Publication Data
US 2019/0057207 A1 Feb. 21, 2019

Related U.S. Application Data

(60) Provisional application No. 62/547,894, filed on Aug. 21, 2017.

(51) Int. Cl.
*G06F 21/36* (2013.01)
*H04L 29/06* (2006.01)

(52) U.S. Cl.
CPC ............ *G06F 21/36* (2013.01); *H04L 63/083* (2013.01)

(58) Field of Classification Search
CPC ................................ G06F 21/36; H04L 63/083
See application file for complete search history.

(56) References Cited

U.S. PATENT DOCUMENTS

| | | | | |
|---|---|---|---|---|
| 8,935,606 B2* | 1/2015 | Knox | .................. | G06F 16/9577 715/245 |
| 8,966,579 B2* | 2/2015 | Mister | .............. | G06Q 20/40145 726/2 |
| 9,646,296 B2* | 5/2017 | Brown | .................. | H04W 12/06 |
| 10,026,180 B1* | 7/2018 | Gu | ............................ | G06T 7/73 |
| 2008/0098464 A1* | 4/2008 | Mizrah | .................. | G06F 21/36 726/5 |
| 2013/0276100 A1* | 10/2013 | Yi | ......................... | H04L 9/3271 726/19 |
| 2016/0065570 A1* | 3/2016 | Spencer, III | ........ | H04L 63/0861 726/7 |

* cited by examiner

*Primary Examiner* — Trang T Doan
(74) *Attorney, Agent, or Firm* — William H. Dippert; Laurence A. Greenberg; Werner H. Stemer

(57) ABSTRACT

Authenticating method for a user of a service uses both a personal computer (PC) and a personal connectable device over a communications network. An enrollment phase must be fulfilled first, for determining a list of properties of the user. Request for a new session is accompanied by the submission of credentials by the user. Then, a type 1 graphic interactive object is evoked in which a grid of colored cells shows on the user PC screen and at least some of the cells of the grid contain images, and at least one was chosen by the user in the enrolment phase. Service continues with an assessment stage unless a type 2 graphic interactive object is employed. A type 2 graphic interactive object only at least one cell in which a color identical to the color appears in the cell on the PC in which a chosen image appeared before.

5 Claims, 5 Drawing Sheets

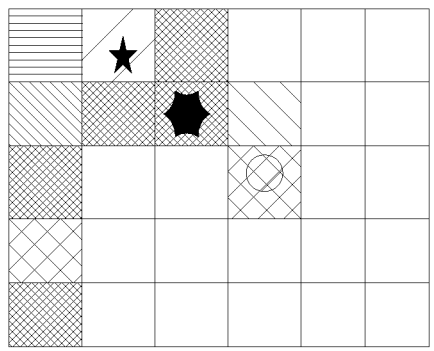
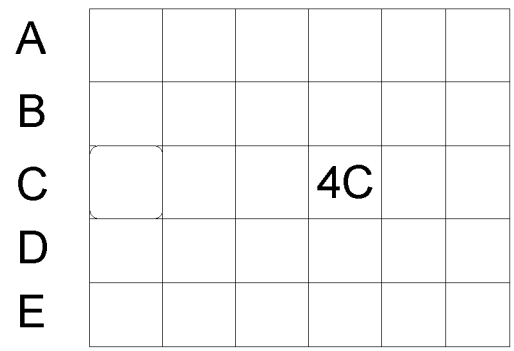
Fig. 4A
Fig. 4B
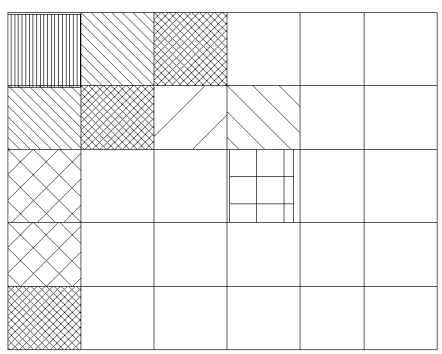
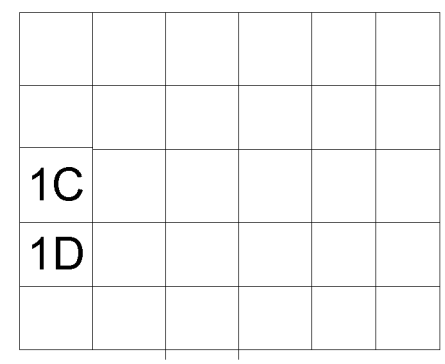
Fig. 4C
Fig. 4D

METHOD AND SYSTEM FOR AUTHENTICATING USERS

CROSS-REFERENCE TO RELATED APPLICATIONS

The present application claims the benefit of priority to U.S. Provisional Patent Application Ser. No. 62/547,894, filed Aug. 21, 2017, entitled "system and method for providing a one time password".

TECHNICAL FIELD

The present invention generally relates to securing data exchange over the Internet. In particular the invention relates to the approval of the authenticity of a user connected to a provider of service.

BACKGROUND ART

Transactions made on-line over the network are very common today. The purchaser or receiver of a service is expected to supply a proof of his/her own true identity, U.S. Pat. No. 7,672,906 B2 sharing inventors with the present invention, discloses a system for providing a means for confirming the authenticity of a user. The user, who enrolls to a service provided, receives a transparent physical grid in the form of a card, typically made of transparent plastic slab, from the service provider (SP), positions it over his/her screen, and overlays it exactly over a matching software rendition of a grid supplied by the SP. The user does not necessarily keep the card permanently attached to his/her screen, but rather may keep it separate and attach it only as needed.

SUMMARY OF THE INVENTION

A method for providing authentication for use by a user of a service. The service issues to a PC user a grid of colored cell some of which contain images such as simplified icons or symbolic figures. The user is authenticated when he/she proves they are able to recognize a specific image out of a multiplicity of images supplied to their PC screen, the proof is effected via a smart-phone application of the user.

BRIEF DESCRIPTION OF THE DRAWINGS

The present invention will be understood and appreciated more fully from the following detailed description taken in conjunction with the appended drawings in which:

FIG. 4A is a diagram showing an exemplary array of cells presented to the user's PC at the beginning of a session with an array (grid) of images to choose from.

FIG. 4B is a diagram showing the equivalent exemplary array of cells presented to the user on his/her smart-phone as in FIG. 4A without the images or colors shown. For sake of explanation of the process the grid cell that the service is expecting to be indicated about is shown FIG. 4C is a diagram showing an exemplary array of cells presenting colors to user at a session to identify color from.

FIG. 4D is a diagram showing the equivalent array of cells relating to the grid in FIG. 4C presented to the user's smart-phone at a session to indicate a selection the user must make. For sake of explanation of the process the grid cells that the service is expecting to be indicated about are shown

DISCLOSURE OF THE INVENTION

Figure 1:
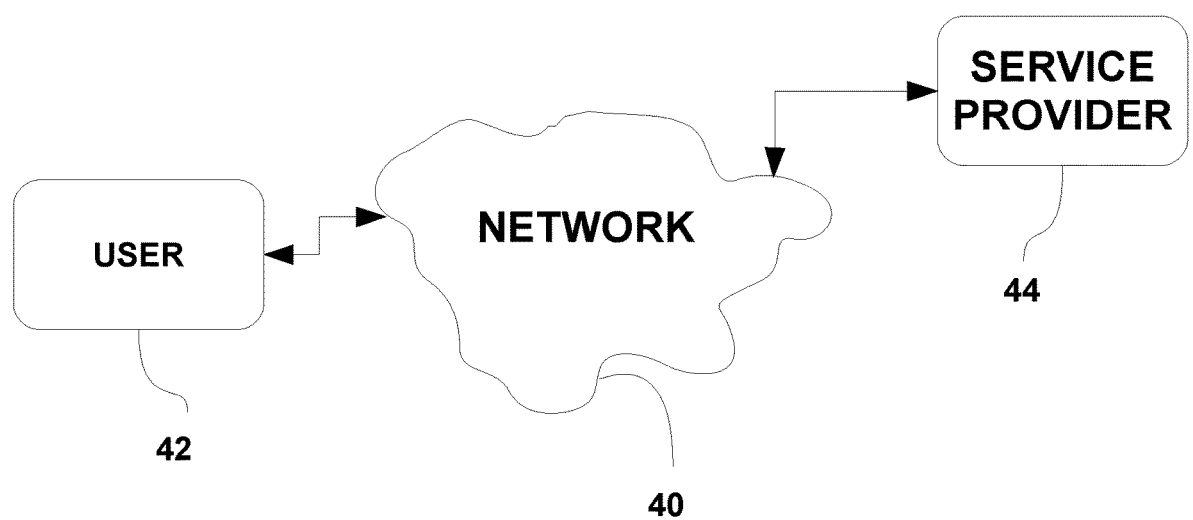
FIG. 1 is a schematic description of connectivity of the user in the framework of the present invention.
Figure 2:
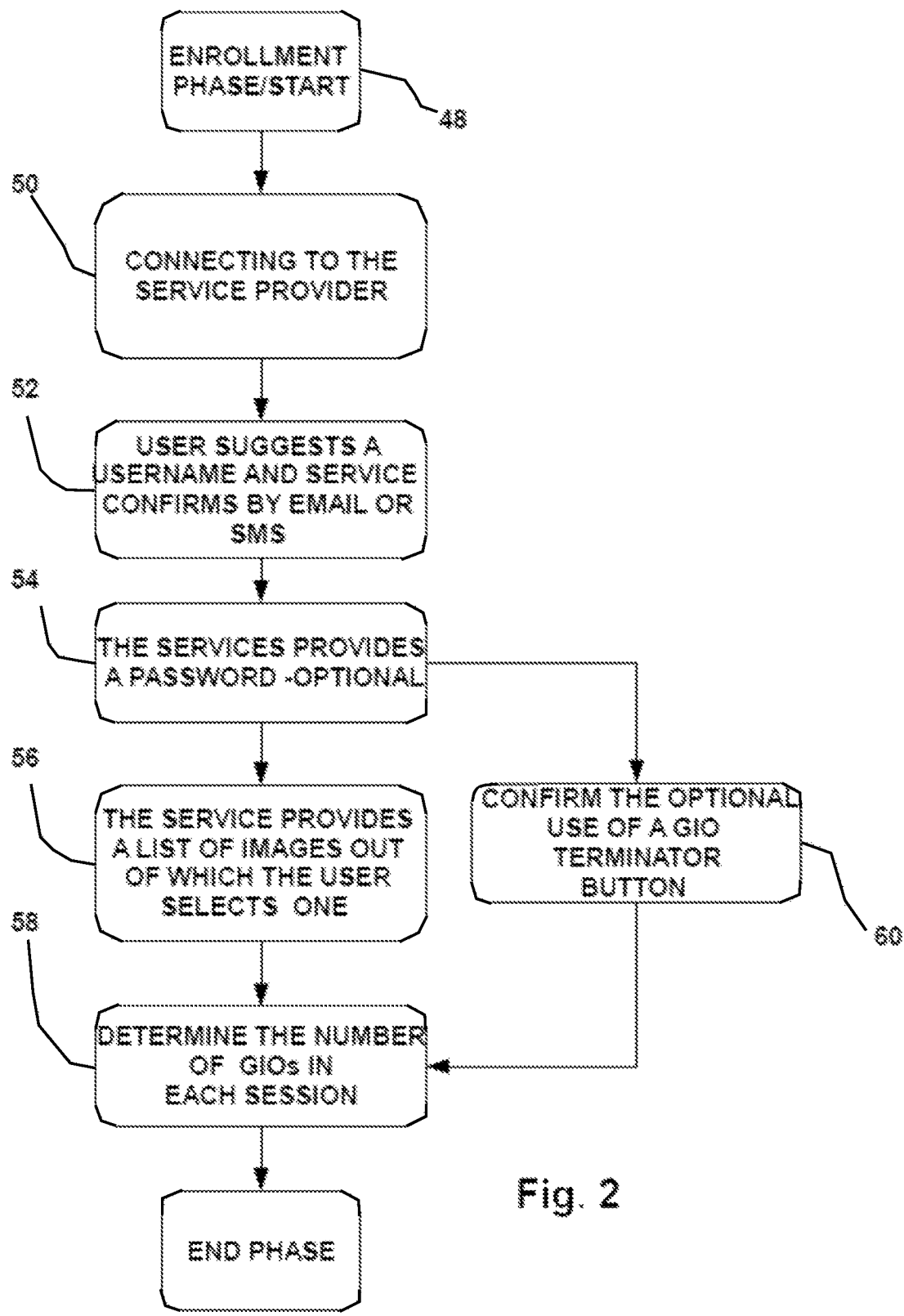
FIG. 2 is a schematic description of the flow of events taking place in the enrollment phase of a user in the present invention, during which the service obtains the properties of a user.

In accordance with embodiments of the present invention, a system and method are provided for authenticating a user for whatever reason in which authentication over the network is required, typically for purchasing of goods or services. As can be seen in FIG. 1 the network connections in which the present invention is implemented are known. Network of any kind applicable 40 such as the Internet, connects user 42 with service provider 44. The user, typically using a personal computer, or a terminal, also has access to a smart-phone or any other hand held or worn instrument connectable to the network Enrollment Phase, to be Completed before the User can Obtain the Service In FIG. 2, an exemplary enrollment phase 48 commences as a user connects to the service at step 50. The user identifies himself/herself by email or phone number and proposes a username, the service in response may confirm this username, and this confirmation is sent by email or by SMS message to the user at step 52. The username is stored by the service. Additionally, a password may be provided to the user at step 54. The service then sends a list of images to the user at step 56, out of which the user selects one image for safekeeping. In parallel or after, the service and user decide how many graphic interactive object (GIOs) are to be included in one authentication session at step 58. Additionally the service determines with the user if the user should use a graphic interactive object terminator button (GIOTB) .The function of the GIOTB will be explained below. Finally the user, at the service database has several properties.

a. Username
b. Entry password (optional)
c. One or more selected images. The selection of an image (one or more) is performed by a procedure in which the service sends a list of images, such as simplified or symbolic to the user PC or terminal (such as a multimedia kiosk). The user selects the image/s by indicating it on a different computer, typically his/her smart-phone.
d. The number of GIOs to be carried out in each authentication session.
e. The use of a GIOTB (yes/no). To be explained below.

However it should be stated that the sequence in which the properties were obtained does not necessarily have to follow the order as described heretofore.

Authentication Procedure.

Figure 3:
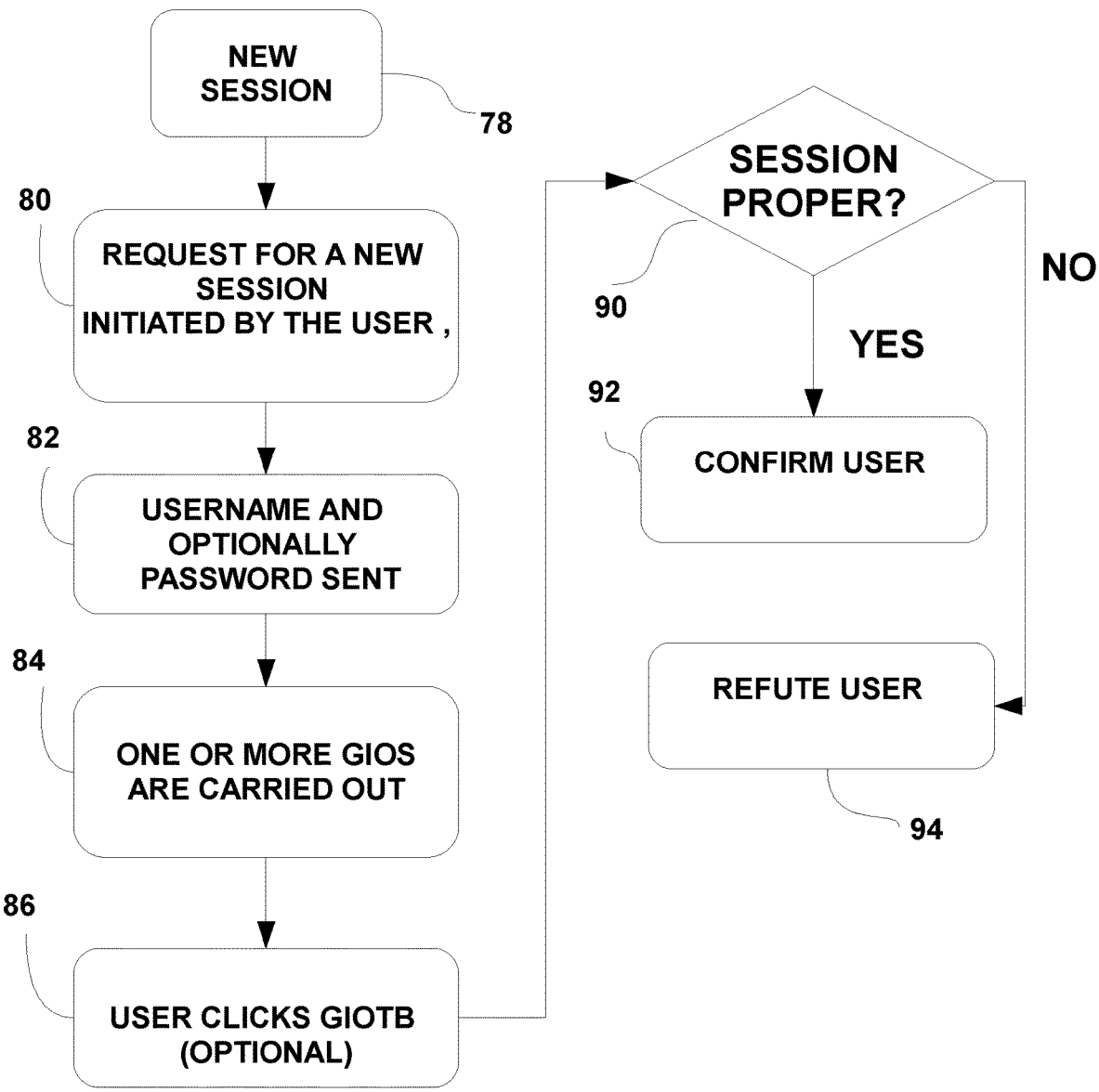
FIG. 3 is a diagram showing the flow of events as an authentication session implementing only one graphic interactive object evolves.

In FIG. 3 an exemplary authentication session is described. The new authentication session is referred to as session 78. In this example, a single GIO is included in the session. The new session is initiated, requested by the user at step 80, followed by submitting the user name and optionally an entry password at step 82 this stage in the session is referred to in general as the credentials submitting stage. The user then goes through the GIO (which is the only GIO employed in this exemplary session) at step 84. At the end of the GIO the user may optionally (as decided in the enrollment phase) click an GIOTB on the smart-phone screen in step 86 to indicate the end of GIO and then the service assesses the interactions with the user in step 90. A proper session results in confirmation (step 92). Conversely, an improper session results in a refutation (step 94)

If more than one GIO is employed in an authentication session, the first GIO is different than the ones that follow. In a multi-GIO session, the first GIO is identical to the GIO employed in a single-GIO session as described above. If more than one GIO is employed, the GIOTB is clicked at the end of the sequence of GIOs, if the use of the GIOTB has been confirmed in the enrollment phase.

The first (or only, in some cases) GIO in an authentication session runs as follows. After establishing the connection with the service provider for starting an authentication session. The user receives to his/her PC screen a (or any other terminal) a structured grid containing cells at least some of which contain images (may be simplified icons or symbolic images). All cells containing images are colored, so that each cell is colored in an own color. The user views the grid sent by the service to the PC screen and identifies the chosen image or images ("secret image") on the PC grid. In parallel, the service also sends an interactive graphic interface (IGI) such as blank grid of structure resembling that of the grid on the PC, to the smart-phone screen of the user using an application. Such grid on the smart-phone contains no colors and no images. The user has to indicate on the smart-phone IGI the equivalent cell/s he/she has recognized on the PC screen grid. For example. the user obtains the PC screen depicted in FIG. 4A he then identifies the secret image is "circle" on one of the cells which he/she has received. This image is expected by the service to coincide with the secret image the user has selected in the enrollment phase. The indication is established typically by clicking on the equivalent smart-phone IGI, typically a blank grid appearing on its screen in FIG. 4B (cell 4C in this example). In another embodiment of the invention, the smart-phone IGI is not a grid but rather a virtual alphanumeric keyboard by which the user is directed to indicate the coordinates in alphanumeric code. The GIO is terminated either as the service receives the indication of choice from the smart-phone grid, or resulting from the user clicking the GIOTB. If a second GIO is evoked, the service randomly redistributes the colored cells in the array on the PC screen (see FIG. 4C), containing colored cells and no images. While the equivalent blank grid on the smart-phone is refreshed, the service is expecting to be fed with fresh input. This blank grid still contains no colors and no images and does not undergo a visible change (see FIG. 4D). Now the user is to respond by clicking on the appropriate cell or cells in the smart-phone grid one or both i.e. 1D, 1C, which have the color formerly (in the first GIO coinciding with the "secret image". In some embodiments indicating one cell would suffice.

If an additional GIO is to be carried out, it begins as before, by the service redistributing the colors in the grid of cells on the PC, without showing images. The user is expected now to indicate a colored cell (or more than one) which contains the same color that was present in the cell that included (one or more) the "secret image/s".

The GIOTB

This graphic object is a part of an IGI. It appears on the IGI even if the properties of the user do not confirm its use by the user. Thus when its use is confirmed, the user uses it when he/she terminates the sequence of GIOs (of the two types). If however a user clicks on the GIOTB when it is not confirmed in the properties of the specific user, the session would fail. Also if the user cuts the number of expected GIOs shorter than the number expected, the session would fail.

The Length of the Authentication Session

The length of the session is determined by the number of GIOs employed (or in other words the length of the sequence of GIOs). Thus, if by chance an impostor has succeeded in a first GIO to guess and indicate the correct image and color associated with, he still does not know the length of the sequence GIOs expected in the session. Thus the service would be expecting a click of the GIOTB at the end of a specific sequence length. If the button has not been clicked in the right place of the sequence or has not been clicked at all (if clicking is required) the session would fail.

The Types and Sequence of GIOs

There are two GIO types. A first type GIO (GIO type 1) in which the user is to select an image (the "secret image" and remember the color in the cell in which the "secret image" appeared.

A second type of GIO is a GIO type 2 in which the user only selects colored cells. Therefore there is no second type without first completing the first type. Thus, if only one GIO is included in a session, it must be an GIO type 1. After the GIOs (one or more) have been completed the service goes through an assessment stage in which the user is either confirmed or refuted.

A General Summary of Session

Figure 5:
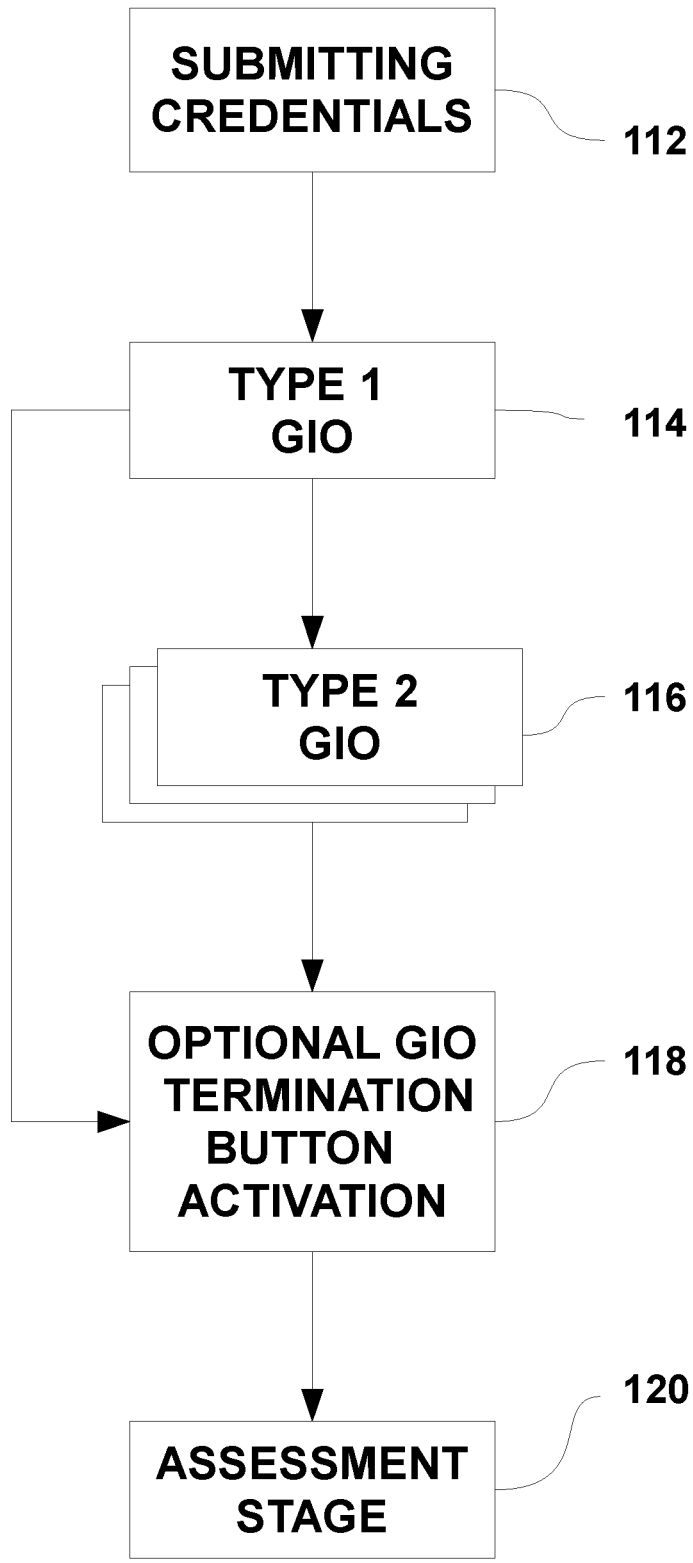
FIG. 5 is a diagram summarizing and generalizing the flow sequence of events in an authentication session in accordance with the invention.

In FIG. 5, a summary of an authentication session sequence in accordance with the present invention is presented. In step 112 the user submits credentials (username and optionally password) to the service. The service then evokes at step 114 a type 1 GIO showing a grid containing colored cells and images on the user PC. If only a type 1 GIO is to be employed in the session, the sequence continues to the assessment stage 118. after the GIO is terminated whether by the service in response to the indication by the user on the IGO at the smart-phone or in response to the user clicking the GIOTB. If the session employs a type 2 GIO, one or more, the next step after step 114 is the evocation of type 2 GIO/s (one or more) in step 116. The sequence of GIOs is terminated either by the user service when the user has finished his/her last indication on the last GIO of the sequence, or the user terminates by clicking on the GIOTB in step 118 when the sequence is finished. Then, the service continues to the assessment stage at step 120.

The invention claimed is:

1. A method for authenticating a user of a service provided over a communications network, wherein the user uses both a personal computer (PC) and a smart-phone, both connected to the communications network, the method comprising the steps of:

the user enrolling in the service by determining credentials comprising a list of properties of the user, said list of properties comprising at least a user name, at least one secret image, an option to use a graphic interactive object terminator button (GIOTB), and a number (N) of graphic interactive objects (GIO)s to be included in an authentication session;

the user starting a new session by the steps of:

1) the user submitting to the service a request for the new session accompanied by submission of the credentials of the user;

2) the service providing, in response to the request, a type 1 GIO, in which a first grid of colored cells is sent to the screen of the PC of the user, wherein at least some of the cells of the first grid contain images, and wherein at least one of said images is said at least one secret image chosen by the user in said enrolling step, and, in parallel, sending by the service to the smart-phone of the user an interactive graphic interface (IGI);

3) the user responding to both the type 1 GIO on the PC and the IGI on the smart-phone of the user by indicating on said IGI on the smart-phone of the user coordinates of a cell on said first grid in which said at least one secret image appeared;

4) if said N is equal to one, going to step 5) or, if said N is greater than one, repeating, until a total number of GIOs sent to the user is equal to said N, the steps of:
   i) the service sending to the PC of the user a type 2 GIO comprising a grid of colored cells with no images; and
   ii) the user responding to said type 2 GIO on the smart-phone of the user by indicating the coordinates of a cell in said grid of colored cells having the same color as the color of the cell in which said type 1 GIO the secret image appeared;

5) the user terminates said new session by one of:
   i) clicking on a GIOTB sent by the service to the smart-phone of the user, if said option to use a GIOTB was selected in said user enrolling step;
   ii) responding to a type 1 GIO if said N is equal to 1, if the option to use a GIOTB was not selected in said user enrolling step;
   iii) responding to said type 2 GIO to each of said type 2 GIO that was sent by said service, if the option to use a GIOTB was not selected in said user enrolling step; and iv) performing session assessment by the service, in which:
   1) the user is confirmed if:
      i) the total number of user responses to GIO is equal to N;
      ii) the user correctly responds to the type 1 GIO by the user by indicating on said IGI on the user's smart-phone the coordinates of the cell on said first grid in which said at least one secret image appeared; and
      iii) correctly responding to each said type 2 GIO sent by the service, by indicating by the user on the smart-phone of the user the coordinates of a cell in said grid of colored cells having the same color as the color of the cell said type 1 GIO where the secret image appeared; or
   2) the user is refused if it failed to be confirmed.

2. The method as claimed in claim 1, wherein said IGI appearing on the smart-phone of the user is a blank grid.

3. The method as claimed in claim 1, wherein said IGI appearing on the smart-phone of the user is a virtual keyboard.

4. The method as claimed in claim 1, wherein said list of properties further comprises a password.

5. The method as claimed in claim 1, wherein each cell in said first grid has a unique color.

\* \* \* \* \*